(12) United States Patent
Bohm

(10) Patent No.: US 12,469,348 B2
(45) Date of Patent: Nov. 11, 2025

(54) INTEGRATED METAL DETECTION ACCESS CONTROL SECURITY GATE

(71) Applicant: ARMATURA LLC, Alpharetta, GA (US)

(72) Inventor: Scott Bohm, Alpharetta, GA (US)

(73) Assignee: ARMATURA LLC, Alpharetta, GA (US)

( * ) Notice: Subject to any disclaimer, the term of this patent is extended or adjusted under 35 U.S.C. 154(b) by 621 days.

(21) Appl. No.: 17/719,451

(22) Filed: Apr. 13, 2022

(65) Prior Publication Data
US 2022/0335763 A1    Oct. 20, 2022

Related U.S. Application Data

(60) Provisional application No. 63/175,721, filed on Apr. 16, 2021.

(51) Int. Cl.
*G07C 9/15* (2020.01)

(52) U.S. Cl.
CPC ..................... *G07C 9/15* (2020.01)

(58) Field of Classification Search
CPC ........................................ G07C 9/15
See application file for complete search history.

(56) References Cited

U.S. PATENT DOCUMENTS

| | | | | |
|---|---|---|---|---|
| 5,694,867 | A * | 12/1997 | Diaz-Lopez | E05G 5/003 109/6 |
| 6,308,644 | B1 * | 10/2001 | Diaz | E05G 5/003 109/6 |
| 6,742,301 | B1 * | 6/2004 | Schwarz | E05G 5/003 49/42 |
| 11,341,794 | B2 | 5/2022 | Reed et al. | |
| 11,688,272 | B2 * | 6/2023 | Bergman | G08B 21/182 340/505 |
| 2004/0217862 | A1 | 11/2004 | Castle et al. | |
| 2005/0024199 | A1 | 2/2005 | Huey et al. | |
| 2005/0078006 | A1 | 4/2005 | Hutchins et al. | |
| 2006/0157206 | A1 | 7/2006 | Weik, III et al. | |
| 2009/0321638 | A1 * | 12/2009 | Hu | G01V 11/00 250/336.1 |
| 2011/0074580 | A1 * | 3/2011 | Mercier | G08B 13/2462 340/541 |

(Continued)

FOREIGN PATENT DOCUMENTS

KR    20130006264 U    11/2013

OTHER PUBLICATIONS

International Search Report mailed Aug. 18, 2022.

*Primary Examiner* — Thomas D Alunkal
(74) *Attorney, Agent, or Firm* — Thomas | Horstemeyer, LLP

(57) ABSTRACT

A barrier component, a metal detector component; and a base structure that physically connects to the barrier component and connects to the metal detector component, wherein the base structure distances the barrier component from the metal detector component a distance that prevents electromagnetic interference between the barrier component and the metal detector component. A monitoring component monitors at least one gate system parameter of the gate system and stores the at least one gate system parameter or transmits the at least one gate system parameter to a monitoring service over a network.

11 Claims, 6 Drawing Sheets

(56) References Cited

U.S. PATENT DOCUMENTS

| | | | | |
|---|---|---|---|---|
| 2011/0273301 A1* | 11/2011 | Dinh | ................ | G01V 3/10 |
| | | | | 340/600 |
| 2012/0112918 A1* | 5/2012 | Dinh | ................ | G01V 3/10 |
| | | | | 324/228 |
| 2015/0310713 A1* | 10/2015 | Kellermann | ......... | G08B 15/007 |
| | | | | 340/541 |

* cited by examiner

Front Page 503

- Event Monitoring
- Device Allocation and Management
- Customer and Account Mgmt

Overview 506

Number of Clients: 15
Total Devices: 225
Runtime Per Device (hrs): 2500

Equipment 509 | New | Total

Devices Over Time
Jan Feb Mar Apr May Jun Jul Aug Sep

Events 512

New Events (today/last login): 8

Total: 47

| Type | Qty |
|------|-----|
| Fault | 35 |
| Repair | 7 |
| Maintenance (awaiting) | 5 |

View Alerts — 515

Front Page

Event Monitoring

Device Management

Customers and Accounts

Registered Devices 530

| Serial No. | Controller Code | Model Id. | Customer | Monitoring | Status | Received Activation | Actions |
|---|---|---|---|---|---|---|---|
| 0000001 | CM2J306003 | AccessG1 | Sch1 | Svc Only | Online, Fault | 2022-6-2 | Notify |
| 0000002 | CM2J128351 | AccessG1b | Bigbox | Cust. Acc. | Online | 2022-6-2 | Manage |
| 0000003 | CM2J306231 | AccessG1 | Sch1 | Svc Only | Online | 2022-6-3 | Manage |
| 0000004 | CM2J201339 | AccessG2 | Secure1 | Cust. Acc. | Online | 2022-7-15 | Manage |
| 0000005 | CM2J947658 | AccessG2 | Secure1 | Cust. Acc. | Online | 2022-7-18 | Manage |
| 0000006 | CM2J491854 | AccessG3 | GrocerA | Svc Only | Offline, Fault | 2022-7-21 | Sch. Svc. |
| 0000007 | CM2J459811 | AccessG3 | GrocerA | Svc Only | Online | 2022-8-7 | Manage |

Map View — 533

FIG. 5B

INTEGRATED METAL DETECTION ACCESS CONTROL SECURITY GATE

CROSS-REFERENCE TO RELATED APPLICATIONS

This Application claims priority to, and the benefit of, U.S. Provisional Application No. 63/175,721, filed on Apr. 16, 2021, and entitled "INTEGRATED METAL DETECTION ACCESS CONTROL SECURITY GATE," the entire contents of which is hereby incorporated herein by reference.

BACKGROUND OF THE INVENTION

Security gates can include turnstiles that permit and allow passage including entrance or exit from a location such as government agencies, transportation venues, entertainment venues, stadiums, conventions, exhibitions, and other areas. In some cases, a person can be required to pass through a turnstile as well as a metal detector in order to be permitted into an area. A metal detector can refer to a detection device that detects whether persons are carrying metal objects. As people's awareness of safety protection continues to increase, the requirements for their own safety and the safety of the surrounding environment are also increasing. The need to limit personal contact is also increasing. Security gates and metal detectors are widely used in government agencies, transportation venues, entertainment venues, stadiums, conventions, and exhibitions.

At present, the commonly used security gate can usually be a doorlike closed-top structure. The detection of metal objects, however, can require manual inspections by staff before and/or after the security gates. In addition to passing the manual inspection, the staff can also pass through the security gate to inspect the passing persons, but there must be a staff member at the security gate. Therefore, the existing security gates can be labor intensive and inconvenient.

BRIEF DESCRIPTION OF THE DRAWINGS

FIG. 5A is a drawing that shows functionalities provided by a user interface of the metal detection access control security gate system of FIG. 1, according to the present disclosure.

FIG. 5B is another drawing that shows functionalities provided by a user interface of the metal detection access control security gate system of FIG. 1, according to the present disclosure.

DETAILED DESCRIPTION

Figure 1:
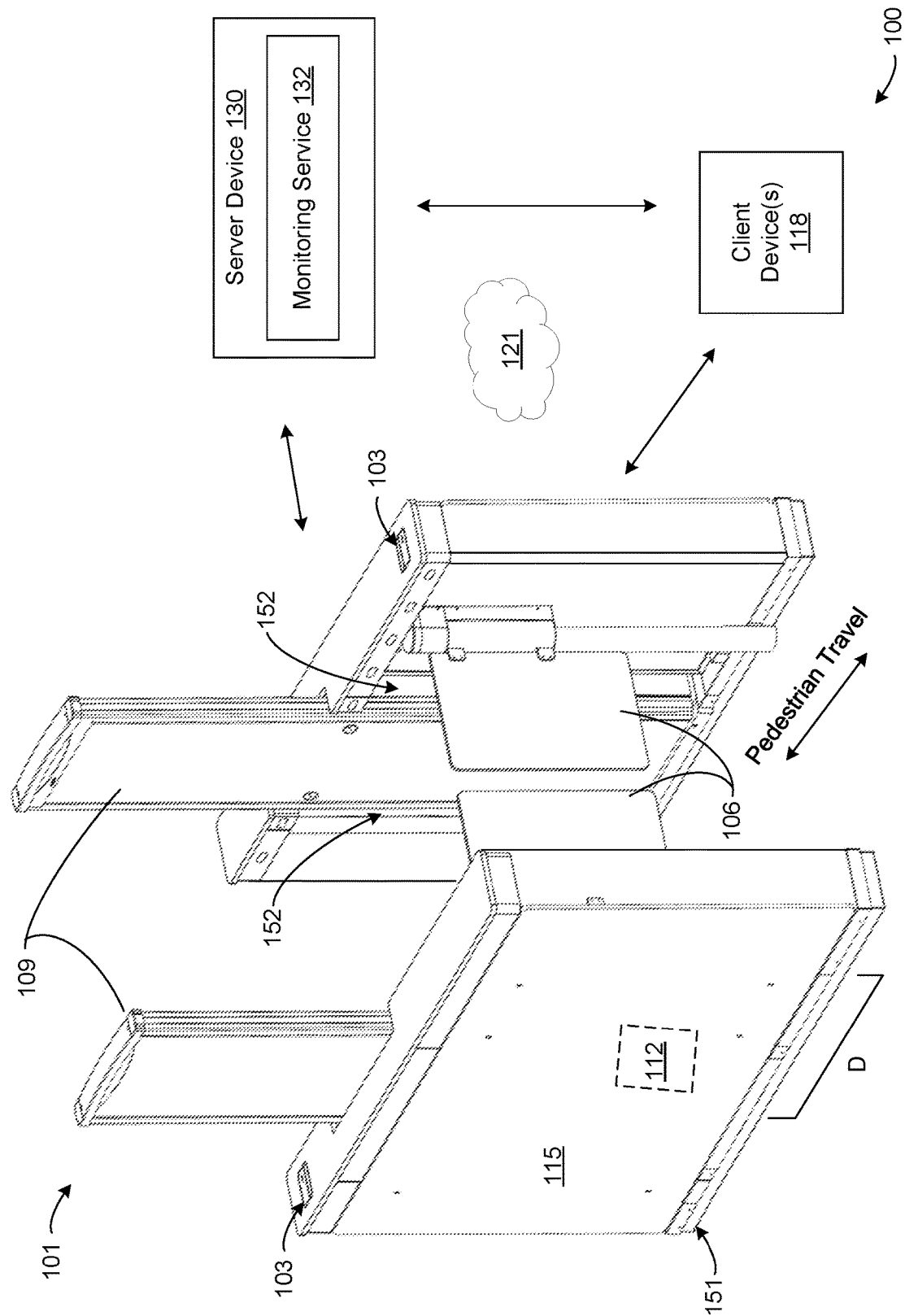
FIG. 1 is a drawing that shows an example metal detection access control security gate system according to the present disclosure.

The present disclosure relates to metal detection access control security gates. The described access control security gates include a built-in metal detector which enhances security level and greatly boosts the efficiency of the security check. By combining inspection and access control, manpower can be saved. The metal detection access control security gate is applicable to the entrance of any facility or area including rooms, factories, stations, schools, venues, and buildings that need security inspection management. When the passengers pass through the metal detection access control security gates, then an indicator light can turn green, the turnstile or gate can open automatically, and the person can pass. In some examples, the entire process can be touchless. Access can be granted based at least in part on one or more of an access control list, a gate control mode, access control credentials, and a metal detection status. However, if access is denied, then the gate can alarm, an indicator light can turn red, the gate will not open, and the user is unable to pass. Notifications can be transmitted to one or more client devices and a server device. The notifications can include whether access is granted or denied, gate parameters including usage and errors, as well as maintenance requirements and information.

In addition to the foregoing general operation, the metal detection access control security gate can provide a number of additional features to provide enhanced security and efficiency. A taller non-overhead metal detection unit can provide greater metal detection granularity and superior metal detection range. For example, the metal detection unit can provide multiple individually-adjustable metal detection zones, including 15, 18, 21, or another number of individually-adjustable metal detection zones, thereby providing greater metal detection granularity compared to other units. The metal detection unit can provide up to 70 inches of metal detection height, thereby providing greater metal detection height range. The metal detection unit's detection distance and the unit's overall physical dimensions can be wider than other devices and up to 40 inches wide in order to enable entrance and exit of emergency medical technicians (EMTs) and other emergency personnel and equipment, such as wheeled and unwheeled gurneys. This width can also facilitate disability access for people in wheelchairs and other users.

Double-sided indicator lights can provide universal notification for security, medical, and other emergency personnel on both sides of the gate, thereby enhancing security and enabling faster response times. Access control integration can manage user entrance. The integrated metal detection access control security gate can provide evaluation of metal detection status and turnstile control in a single unit, enabling the turnstile to open independently from the metal detection results in certain scenarios. For example, while existing technologies require metal detection to be below a threshold in order for a turnstile or gate to open, the integration of metal detection and access control along with the turnstile unit can enable the unit to ignore or turn off metal detection for certain users and access control levels.

Further, existing technologies do not integrate the metal detector and turnstile in a single integrated unit. The turnstile barrier and motor activation, as well as the vibration caused by the motion of the turnstile barrier can cause false positives and other metal detection problems. However, the present disclosure describes an integrated unit that provides a distance between the turnstile or barrier component and the metal detection component, and further includes rigidity components including an acrylic sheet and metal detector brackets. These features increase accuracy and reduce false positives. The distance can be chosen based at least in part on measurements of the effects on the barrier and motor of the barrier unit on the electromagnetic fields generated by the metal detection component. For example, the distance between the barrier component and the metal detection component can correspond to a distance at which the electromagnetic fields vary less than a predetermined threshold when the barrier component is activated. A base bracket structure can include respective connection points at the distance that reduces interference between the barrier component and the metal detection component. The base bracket structure can be affixed to a floor using anchors or another physical connection.

The unit can provide enhanced access control to have an access control setting associated with their user or group access control credentials. The integration of metal detection and access control enables the gate to open for selected users, such as police, fire, rescue, medical, as well as other security and emergency personnel regardless of metal detection status and/or bypassing metal detection status evaluation for these users.

Access control credentials can include biometric credentials, BLUETOOTH®, Wi-Fi®, and other wireless credentials, ID cards, character (e.g., textual) codes, Quick Response (QR) codes, bar codes, password input, and other credentials. Biometric credentials can include one or more of: facial recognition, retina recognition, fingerprint recognition, finger geometry recognition, such as three dimensional geometries of one or more fingers, hand geometry recognition including length and width of the palm and one or more fingers, vein recognition of fingers and palm, voice recognition, and others. The credentials can include touchless credentials including the wireless credentials, ID cards, character codes, QR codes, bar codes, ID cards, and many of the biometric credentials as can be understood. A lifecycle evaluation module or monitoring component can monitor gate usage and measure parameters of the gate, metal detector, and other components in order to evaluate maintenance requirements for a maintenance schedule of the components.

Temperature detection can also be performed by a temperature detection component. Temperature detection can also be activated or deactivated for a particular time period, according to health risks, for particular events, users, groups, and access control levels.

The metal detection access control security gate can also track a total number of persons in the area, based at least in part on entrance and exit of persons through any number of networked metal detection access control security gates servicing an area. The gate or turnstile can stay closed and notify the user that capacity has filled for the event, area, or venue.

Moving to the figures, FIG. 1 shows an example metal detection access control security gate system 100 according to the present disclosure. The metal detection access control security gate system 100 can include a metal detection access control gate 101, a client device 118 and a server device 130. The metal detection access control gate 101 can include one or more access control reader devices 103, a barrier component 106, a metal detector component 109, and a lifecycle evaluation and monitoring component 112. The metal detection access control gate 101 can be communicatively connected with a local or cloud-based server device 130 as well as one or more client devices 118 over the networks 121.

The networks 121 can include wide area networks (WANs) and local area networks (LANs). These networks can include wired or wireless components or a combination thereof. Wired networks can include Ethernet networks, cable networks, fiber optic networks, and telephone networks such as dial-up, digital subscriber line (DSL), and integrated services digital network (ISDN) networks. Wireless networks can include cellular networks, satellite networks, Institute of Electrical and Electronic Engineers (IEEE) 802.11 wireless networks (i.e., Wi-Fi®), BLUETOOTH® networks, microwave transmission networks, as well as other networks relying on radio broadcasts. The network 121 can also include a combination of two or more networks 121. Examples of networks 121 can include the Internet, intranets, extranets, virtual private networks (VPNs), and similar networks.

An access control device 103 or access control reader device can include one or more types of access control detection. For example, the access control device 103 can include hardware components capable of detecting BLUETOOTH®, Wi-Fi®, radio frequency identification (RFID) and other wireless ID cards, character codes, Quick Response (QR) codes, bar codes, password inputs, as well as biometric credentials including facial recognition, retina recognition, fingerprint recognition, finger geometry recognition such as three dimensional geometries of one or more fingers, hand geometry recognition including length and width of the palm and one or more fingers, vein recognition of fingers and palm, voice recognition, and other credentials. In some examples, the access control device 103 can also include a touch display through which an access code can be entered and information can be provided to users and technicians.

The metal detection access control gate 101 can also include an internal control panel inside a secured enclosure or master pedestal. The control panel can include a display that shows pedestrian passage count, alarm count, password settings, and other information. Additional information can be accessed through the menu provided. The control panel can provide the ability to update mode selection, metal detection sensitivity settings including general and zone-specific sensitivity settings, alarm time, gate open duration, audible alarm on-off-volume, alarm duration, date and time settings, network connection settings, and other settings. Lifecycle storage settings can indicate the type of information to collect and store locally and/or transmit to the monitoring service 132, including alarm count, pedestrian count (barrier activations), voltage-over-threshold events, current-over-threshold events, power-over-threshold events, and other lifecycle events. In addition to alarm and pedestrian counts, specific alarm events and pedestrian entry events can be logged. Events can include a timestamp. Pedestrian entry events can further include an indication of a user identity.

Metal detector calibration can include choosing a predetermined size or piece of metal as a sample and then increasing the sensitivity setting for the metal detector as a whole or the particular zone so that when the desired sample enters through the metal detector, it triggers the alarm and correctly lights up the lights for the zone and the corresponding metal detection panel. The sensitivity can be decreased until no alarm is triggered. Metal objects larger than the sample will be detected and will trigger the alarm, accordingly.

Selectable modes can include (1) a high security mode that checks or scans pedestrians both inbound and outbound for valid credentials and/or metal objects to deter workplace violence and prevent both unauthorized access & employee theft (2) a mode that scans only inbound pedestrians for valid credentials and/or metal objects (3) a mode that scans only outbound pedestrians for valid credentials and/or metal objects (4) a mode that scans neither inbound nor outbound pedestrians for valid credentials and/or metal objects but rather uses IR sensors to open barriers on detection in order to slow pedestrian traffic or expediate egress (5) a mode that scans inbound pedestrians for valid credentials and metal objects, but restricts all outbound pedestrians (6) a mode that restricts all inbound pedestrians regardless of valid credentials, but scans only outbound pedestrians for valid credentials and/or metal objects (7) a mode that permits all inbound pedestrians and restricts all outbound pedestrians regardless of valid credentials or metal detection (8) a mode that permits all outbound pedestrians and restricts all inbound pedestrians regardless of valid credentials or metal detection (9) a mode that restricts all inbound and outbound regardless of valid credentials or metal detection, and (10) a mode that keeps gates open at all times and does not scan credentials. In some examples, gates can be left open regardless of credentials, and can close and alarm based at least in part on metal detection. In some examples where inbound and/or outbound pedestrians are restricted, a particular access level such as security, administrative, or other access level can nevertheless be allowed entry for any mode, while other access levels remain restricted in those modes. However, in some cases, the security, administrative, or another access level can be restricted along with other access levels.

Configuration settings can also include a barrier component 106 opening speed that controls the speed at which the barrier component 106 opens. The lower the value is programmed, the faster the opening speed. A barrier component 106 opening deceleration speed can affect deceleration of the barrier component, the longer the deceleration time and the more stable the barrier component 106 operation. A barrier component 106 opening compensation speed can be configured if the barrier component 106 cannot open to the limit or shakes. The higher the value is programmed, the faster the compensation speed. A barrier component 106 closing speed can control the speed at which the barrier component 106 closes. The lower the value is programmed, the faster the speed. Barrier component 106 closing deceleration speed can affect barrier deceleration. The higher the value, the longer the deceleration time and the more stable the barrier component 106 operation becomes. Barrier component 106 closing compensation speed can control the speed at which the barrier component 106 closes. The lower the compensation value is programmed, the faster the speed.

An open duration time can control how long the barrier component 106 remains open after a pedestrian is allowed passage. Upon arriving at the programmed time, the swing-barriers can close automatically. Barrier component 106 closing delay time can control how quickly the barriers close once a pedestrian completely exits the turnstile lane. A force resistance setting of the barrier component 106 can set a resistance to force applied and can resist when pedestrians press against it.

A clutch start angle can set the angle at which the clutch starts. When the barrier component 106 is unlocked in an unauthorized manner, the clutch locks automatically at this angle. A clutch alarm setting can be set to have a delayed unlock, or authentication to unlock the clutch. In some examples, entry and exit can be set independently, and visible and audible alarms can be set to alert or activate.

An anti-pinch area setting can indicate whether all sensors or a limited subset of the sensors can signal anti-pinch, which can prevent barrier closure or re-open barriers upon detection of an obstruction. In some settings, the first and last pairs of position sensors (and the anti-tailgating sensors) can be omitted or excluded from the anti-pinch operation.

False direction or wrong direction detection (e.g., a pedestrian enters from a wrong side based at least in part on the inbound or outbound direction) can also be set. Position sensors and anti-tailgating sensors can be used to detect a pedestrian entering from the wrong direction. A wrong direction detection can be configured to close, alarm, close and alarm, or ignore. Anti-tailgating can also be detected. If a second pedestrian enters the passageway, as detected based at least in part on the anti-tailgating sensors, prior to a previous user's tripping a particular pedestrian detection sensor. Pedestrian detection sensors can include anti-tailgating sensors, position sensors, and metal detection area sensors.

The barrier component 106 can include one or more positionable gates, turnstiles, or other barrier devices that can be positioned into multiple different positions such as an open position and a closed position. The gate can be made of tempered glass, plexiglass, plastic, metal, and other materials. In some cases, the barrier component 106 can be in a closed position that obstructs passage through the central user passageway of the metal detection access control gate 101 unless access should be granted. While general operation includes the gates in a closed position until access is granted, an 'open' or 'off' mode can be set for certain events, such that the barrier component 106 is open at all times.

A configuration can also tune the synchronization between the two sides of the barrier component 106. One side can be primary or control the operation, while the other secondary side can respond to a wired or wireless signal to mirror its operation. The reaction of the secondary side can be configured to have a longer or shorter delay relative to the primary side. In some cases, the primary side operation can also be configured.

The metal detection access control gate 101 can be fully integrated such that one side of the barrier component 106 and one side of the metal detector component 109 are integrated into a single device that includes a gate and a metal detector in a single physical structure. This integrated unit provides a distance between the turnstile or barrier component 106 and the metal detector component 109, and further includes rigidity components including an acrylic sheet siding and metal detector support bracket 152. These features increase accuracy and reduce false positives. The distance can be chosen based at least in part on measurements of the effects on the barrier and motor of the barrier unit on the electromagnetic fields generated by the metal detector component 109.

For example, the distance between the barrier component 106 and the metal detector component 109 can correspond to a distance at which the electromagnetic fields vary less than a predetermined threshold while the barrier component 106 is activated. A base bracket structure 151 can include respective connection points at the distance that reduces interference between the barrier component and the metal detection component. The base bracket structure 151 can be affixed to a floor using anchors or another physical connection. The base bracket structure 151 can also connect to the metal detector support bracket 152. The metal detector support bracket 152 can include metal bars or supports that increase rigidity and decrease flex of the metal detector component 109 in a direction perpendicular to the direction of pedestrian travel through the metal detection access control gate 101.

While referred to as a single component for clarity and brevity, the metal detection access control gate 101 can include two sides or halves that operate in a synchronized fashion. For example, the barrier component 106 can include two sides or halves that operate in a synchronized fashion. The two sides of the barrier component 106 can be communicatively connected in a wired or wireless connection to a control component. Likewise, the metal detector component 109 can include two sides or halves that operate in concert and are communicatively connected in a wired or wireless connection with the control component. The control component can include a circuit that is part of or communicatively coupled with the monitoring component 112 and/or the access control device 103.

A side of the metal detection access control gate 101 can have a single acrylic panel 115 that extends the length of the side of the metal detection access control gate 101 from an entry point to the exit point, and from a ground level up to a hand rail level. The side of the metal detection access control gate 101 can join one side of the gate component to one side of the metal detector component 109 in a physically and electrically integrated structure and device that also include the access control device 103. The structure can further integrate gate control to check one or more of a user identity and pass a metal detection test (confirm lack of metals) as a double or multi-aspect security access test.

In other words, for the inbound direction, before the barrier component will open, the access control device 103 can confirm the user credentials and/or the metal detector component 109 can confirm the absence of metal items with sizes over a pre-set threshold value. When a user credential such as a card or code has been verified and a pedestrian has entered the turnstile lane, the metal detector component 109 can sense whether there are metal objects whose size exceeds the pre-set limit. If no metal is detected, or no metal that exceeds the threshold value, the metal detector component 109 can open for the pedestrian to pass through. Conversely, if pedestrians are detected carrying metal objects whose size exceeds the pre-set value, the control component of the metal detection access control gate 101 can immediately trigger an alarm event. The alarm event can be logged and time stamped, the general alarm lights and alarm zone specific lights or LEDs can illuminate (e.g., red), and the barriers can close if open or remain closed. A summary of example functionality of the metal detection access control gate 101 is provided in table I.

TABLE I

|  | I | II | III | IV |
|---|---|---|---|---|
| Access Control | Success | Success | Fail | Fail |
| Metal Detection | Under threshold | Over threshold | Under threshold | Over threshold |
| Barrier Action | Open | Closed | Closed | Closed |
| Alarm Action | None | General and Zone-Specific Light, Audible Alarm | None or General Light and no Audible Alarm | General and Zone-Specific Light, Audible Alarm |

A height of the hand rail level can be half or more than half of a total height of the metal detector component 109. The rigidity provided by the acrylic component can prevent motion of the metal detector component 109, which increases accuracy and prevents false positives, thereby benefiting the functional operation of the metal detection access control gate 101 as a whole.

A height of a metal detector support bracket 152 can be less than the height of the hand rail level. The metal detector support bracket 152 can decrease flexion of the metal detector component 109 and can decrease false positives. The metal detector support bracket 152 can include a rigid metal component that connects to the base bracket and to the metal detector component 109 at a predetermined height up to and less than the height of the hand rail. The metal detector support bracket 152 can be wider than a width of the metal detector component 109 perpendicular to the pedestrian walkway. The metal detector component 109 for a particular side of the metal detection access control gate 101 can have two metal detector support brackets 152, one on each side. In some cases, the metal detector support bracket 152 can provide a slot, channel, or element that matches a width of the metal detector component 109, into which an edge of the metal detector component fits.

However, control of the barrier component 106 and the metal detector component 109 can be independent from one another. For example, a certain event or mode can enable and disable the barrier component 106 and the metal detector component 109 independently. Moreover, an access control level for certain events, users, and groups can cause the metal detection access control gate 101 to independently operate the barrier component 106 and the metal detector component 109. In some examples, the turnstiles or gates of the barrier component 106 can be opened so that they are recessed or flush-mounted with the inside edges of a body of the metal detection access control gate 101 so that the central user passageway remains fully unobstructed.

The metal detector component 109 can include an open-top or open-overhead design. This can allow very tall objects and persons to pass, while also providing a high range of granular metal detection. The metal detector component 109 can provide 18 independently adjustable metal detection zones. Each zone can be configured to trigger a detection event in response to a metal detection that meets a specified threshold level of metal detection according to mass, volume, another physical parameter, or an arbitrary and/or unitless metal detection threshold parameter.

The monitoring component 112 can monitor usage and other parameters of the metal detection access control gate 101. For example, the monitoring component 112 can monitor gate or barrier component 106 usage including a number of times a barrier component 106 is utilized including one or more of each opening, each closing, each open-close-cycle, and other gate usage parameters. Barrier component 106 error parameters can specify a number of times the gate (side-specific if there are two gates) has failed to open or close, for example, according to a threshold angle or another opening threshold value. Other barrier component 106 parameters can include a detected range of travel that can be indicative of a problem but does not count as a failure, for example, because the obstruction is minimal. However, if the detected range of travel differs from the configured range of travel, then the monitoring component 112 can store or notify the discrepancy and provide that data to be generated in a user interface. The monitoring component 112 can evaluate the monitored barrier component 106 usage parameters according to maintenance, security, and other lifecycle rules to identify progress towards, and triggering of, a maintenance event. In some examples, a barrier component 106 motor or actuator can include a specification that includes a number of parameters that can be retrieved or received as input.

The parameters can include a rated number of actuations, recommended maximum number of actuations in a predetermined time period, open-close cycles, voltage, current, power, instantaneous peak power, average power over a period of time, and other operational parameters. The monitoring component 112 can monitor one or more of the operational parameters and trigger a notification if the actual value measured or monitored exceeds a threshold percentage, including percentages that are under, over, and equal to the rated value. The metal detector component 109 can also have a rated number of activations, voltage, current, power, instantaneous peak power, average power over a period of time, and other operational parameters. The sensor components can also have a rated number of activations, voltage, current, power, instantaneous peak power, average power over a period of time, and other operational parameters. The overall metal detection access control gate 101 can also include a rated number of activations, voltage, current, power, instantaneous peak power, average power over a period of time, and other operational parameters. Each of the operational parameters of the metal detection access control gate 101 and its constituent components can be monitored and evaluated to trigger maintenance events.

If a maintenance event is triggered, a notification can be generated and provided through a user interface generated by the metal detection access control gate 101 (e.g., using a display of the access control device 103 or another display), the server device 130, and/or the client device 118. In some cases, the notification can include transmitting a message such as an SMS message transmitted to a client device 118 associated with an administrative user, and/or an email message transmitted to an address associated with an administrative user and accessed using a client device 118.

In some examples, the monitoring component 112 can transmit the event to the server device 130, and the server device 130 can store the data and transmit the notification or provide the notification through a network site or user interface generated by the monitoring service 132. The monitoring component 112 can also transmit the progress towards the maintenance event to the server device 130 and the client device 118. A user interface can include a graphical depiction of the progress towards the maintenance event. In some cases, the notification can include information such as the set of gate usage and/or error parameters that triggered the maintenance event, a description of a specified maintenance action, and other information. The gate lifecycle rules can be stored locally, or by a client device 118, or by the server device 130. The monitoring component 112 can periodically retrieve or receive gate updated lifecycle rules from the server device 130 or the client device 118.

The server device 130 can refer to a server computer, or any other system providing computing capability. The server device 130 can be physically located on premises with the metal detection access control gate 101 and connected using a private, local, or wide area network 121, or can be cloud-based and accessed using a public wide area network, such as the Internet. While referred to in the singular, the server device 130 can include a plurality of computing devices that are arranged, for example, in one or more server banks, computer banks, or other arrangements. The computing devices can be located in a single installation or can be distributed among many different geographical locations.

The server device 130 can include a data store that stores lifecycle rules including maintenance requirements and error conditions that can be triggered based at least in part on usage and other parameters detected from the metal detection access control gate 101. The data store can also include one or more access control lists or other access control data structures that can specify time-limited (e.g., event-based) users and groups, as well as durable or good until canceled (GTC) users and groups that are associated with corresponding credentials according to user and/or group. The metal detection access control gate 101 can use TCP/IP communications to access the access control list or other access control data structure. Access can be used on-demand when a user offers credentials using an access control device 103 or the metal detection access control gate 101 that can access the access control data structure to update an internal data store to include the most up-to-date version of the access control data structure. The access control data structure can also include verification data that is capable of verifying the credentials discussed by matching, comparison, and other methods.

The client device 118 can be representative of one or more client devices 118 that may be connected to the network 121. Examples of client devices 118 include processor-based systems, such as desktop computers, laptop computers, a personal digital assistant, a cellular telephone, a smartphone, a tablet computer system, smart speakers or similar headless devices, or any other device with like capability. The client device 118 can also be equipped with networking capability or networking interfaces, including a localized networking or communication capability, such as a near-field communication (NFC) capability, radio-frequency identification (RFID), (Wi-Fi®), BLUETOOTH®, read and write capability, and other localized communication capability.

The client device 118 can execute an operating system, as well as a number of applications and other executable instructions. The client device 118 can generate and/or access a user interface that enables an administrative user to configure and manage access control settings and access control lists according to users, groups, events, and others. The user interface can also configure metal detection settings for each metal detection zone and other configurations and modes for the metal detection access control gate 101. The client device 118 can also view usage and other lifecycle parameters of the metal detection access control gate 101. For example, the client device 118 can execute an application or other instructions that generates the user interface.

The server device 130 can also generate the user interface that enables the administrative user to configure and manage access control settings, metal detection settings for each metal detection zone, and other configurations and modes for the metal detection access control gate 101. In some cases, the client device 118 can log in with a username and password through a browser or another application to access a user interface generated by the server device 130. The server device 130 and/or the client device 118 can transmit commands to control aspects of the operation of the metal detection access control gate 101. The metal detection access control gate 101 can also include a computing device that can generate the user interface for access through a dedicated monitor, or display, or while using a client device 118. In various examples, the access control device 103, an internal monitor, or a client device 118 connected using a wired or wireless connection can provide this information.

Figure 2:
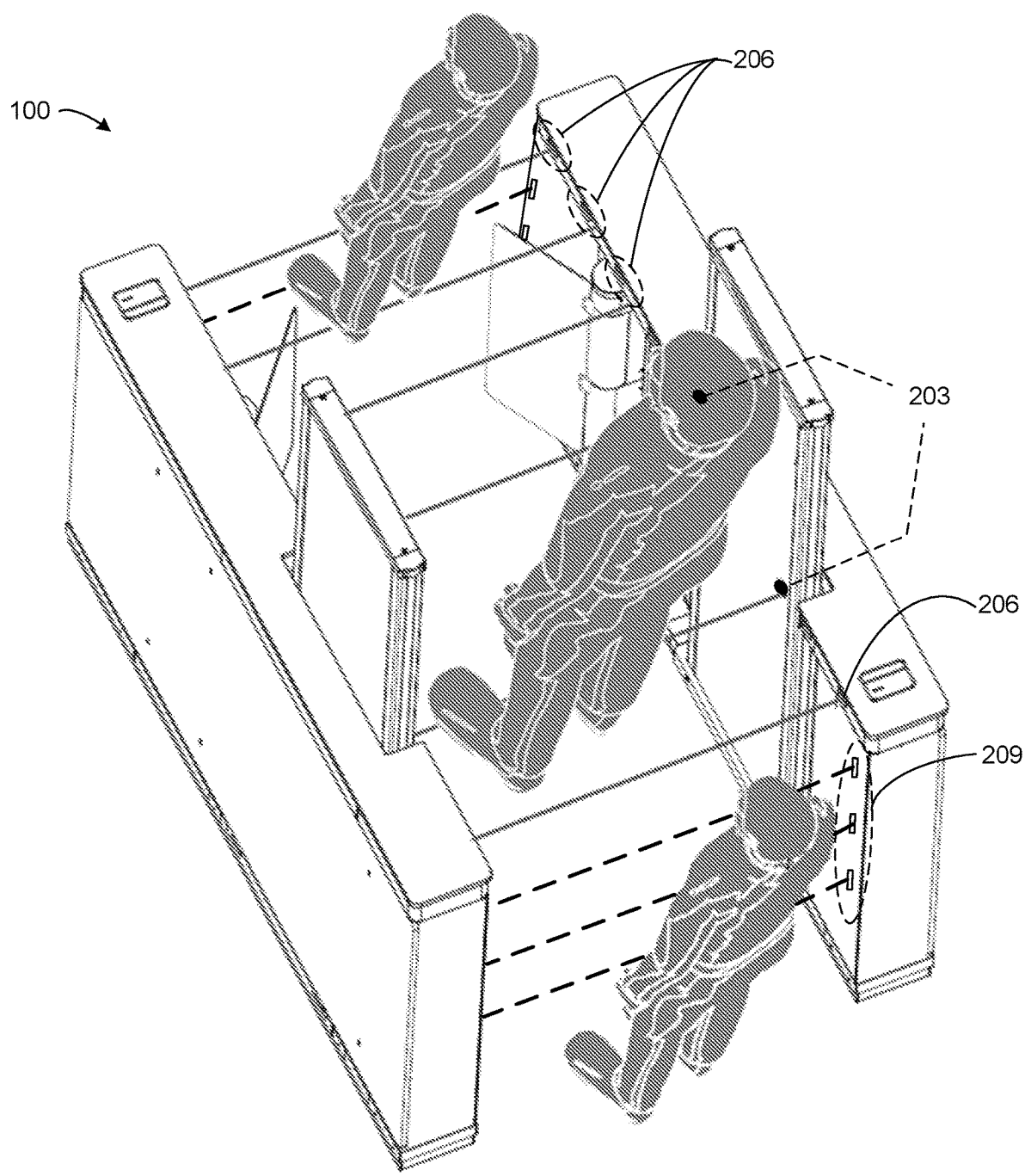
FIG. 2 is a drawing that shows another view of the metal detection access control security gate system of FIG. 1, according to the present disclosure.

FIG. 2 shows another view of the metal detection access control gate 101. This view shows that the metal detection access control gate 101 can also include pedestrian sensors that include metal detection passage sensors 203, position sensors 206, and anti-tailgating sensors 209. These pedestrian sensors can ensure that the pedestrian or user has passed through each portion of the metal detection access control gate 101 in a correct order and direction, and can enable safe opening and closing of the barrier component 106.

The pedestrian sensors can also cause alarm events to trigger, which can include silent alarms that are monitored, stored, and transmitted to the server device 130, as well as audible and/or visible alarms that trigger lights and alarm speakers. The alarm event data transmitted to the server device 130 can include a type or category of alarm such as tailgating, wrong direction, pinch prevented, door forced, and other alarm event types.

The metal detection passage sensors 203 can include infrared, laser, or detection sensors. There can be multiple metal detection passage sensors 203 so that a control circuit of the metal detection access control gate 101 can determine whether a person has entered and/or exited the metal detector component 109, and the person's progress through the metal detector component 109. For example, in some cases, the metal detector component 109 can be activated once a person triggers a particular one of the metal detection passage sensors 203 indicating the person has entered a detection area of the metal detector component 109. The metal detector component 109 can be deactivated once a person triggers another one of the metal detection passage sensors 203 indicating the person has exited a detection area of the metal detector component 109.

While two metal detection passage sensors 203 are shown, there can be additional sensors, for example, a metal detection passage sensor 203 before the detection area, another metal detection passage sensor 203 after the detection area, and another metal detection passage sensor 203 within the detection area. The additional metal detection passage sensor 203 can ensure that a person actually entered the detection area rather than, for example, walking up to the first sensor and turning back. Any number of metal detection passage sensors 203 can be used to granularly detect user passage through the metal detector component 109.

The position sensors 206 can include infrared, laser, or detection sensors. There can be multiple position sensors 206 so that a control circuit of the metal detection access control gate 101 can determine a person's progress through the metal detector component 109 and whether the person has completely passed through. For example, in some cases, the barrier component 106 can be opened once a person passes a particular location based at least in part on the position sensors 206. The barrier component 106 can open away from the user, and away from the currently detected position. The barrier component 106 can be closed once a person passes another location based at least in part on the position sensors 206. In this way, the user passage through the barrier component 106 can be touchless. This can also prevent pinching. While six position sensors 206 are shown, any number of position sensors 206 can be used to granularly detect user passage through the barrier component 106.

Anti-tailgating sensors 209 can include a first vertically aligned set of sensors that can be positioned at a first end of the metal detection access control gate 101 and another array or set at the other end. The vertically aligned array can prevent duck-under tailgating. As a result, at least one of the anti-tailgating sensors 209 can be positioned below a level of the position sensors 206 and the metal detection passage sensors 203. In one example, if a first pedestrian passes the first vertically aligned set of sensors, but has not triggered or passed a predetermined or configured one of the pedestrian sensors, then an alarm event can trigger, and/or the barrier component 106 can close. The configured pedestrian sensor can be any of the position sensors 206, the metal detection passage sensors 203, and the other anti-tailgating sensor set 209.

Figure 3:
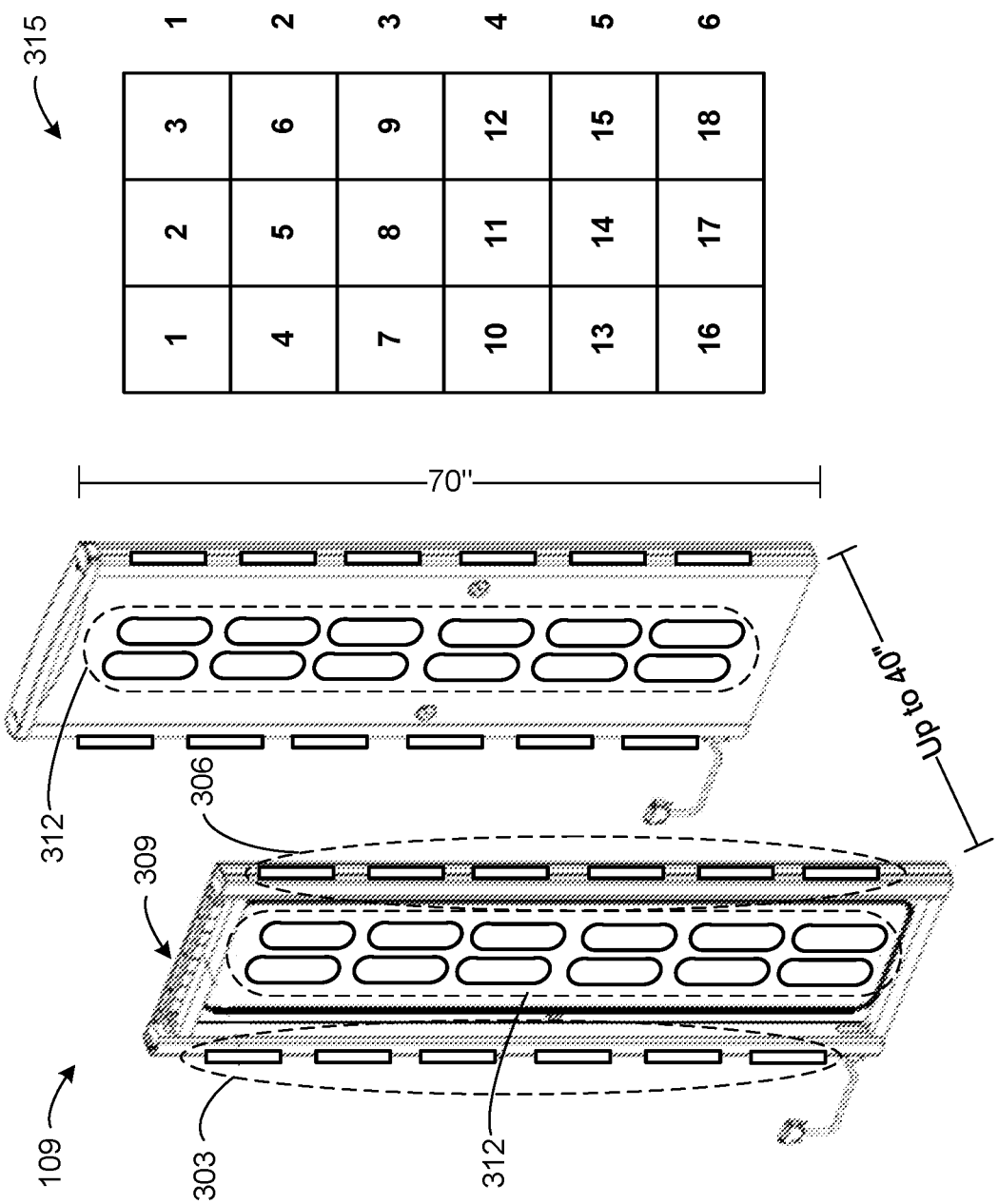
FIG. 3 is a drawing that shows a cutaway internal view of an open-top metal detection component of the metal detection access control security gate system of FIG. 1, according to the present disclosure.

FIG. 3 shows an internal view of a metal detector component 109 of the metal detection access control gate 101. The metal detector component 109 can include an open-top or no-overhead design. The metal detector component 109 can include two substantially similar vertical components which can include a front metal detection indicator light array or front light array 303, a back metal detection indicator light array or back light array 306, a double-sided top light 309, and a metal detection array 312.

The metal detector component 109 can have double sided lights capable of alerting a position of a metal object on a person. While existing technologies typically provide detection lights on just a single side (usually inside the area or venue), the metal detection access control gate 101 can include double-sided metal detection alert lights. This can help reduce personnel by providing a user with an indication of where on his or her person the metal object is located while the user is still outside the area or venue, so the person can remove the object prior to entry where possible. This can also be a security feature since people including security and emergency response persons may be on either side of the gate barrier.

Each vertical component of the metal detector component 109 can include a metal detection array 312 that includes a set of metal detectors that has the power and ability to detect metal from a distance that is at least half of the passageway width, which can be up to 40 inches. The metal detector component 109 detection distance, and the unit's overall physical dimensions, can be wide enough to enable entrance and exit of emergency medical technicians (EMTs) and other emergency personnel and equipment, such as wheeled and unwheeled gurneys. The increased width can also increase the speed of entrance and exit of users and, thereby increase efficiency of users using the metal detection access control gate 101.

The increased width can also be provided by using a metal detection array 312 that includes a number of parallel sets of metal detection elements parallel about a vertical axis along which a respective one of the parallel sets are aligned. Each parallel set can correspond to a vertical position associated with a metal detection height or height range. Each parallel set can also be associated with a particular side of the metal detection access control gate 101. The metal detector component 109 can provide 18 individually-adjustable metal detection zones 315, thereby providing greater metal detection granularity compared to other units. The metal detection unit can provide up to 70 inches of metal detection height, thereby providing greater metal detection height range. The lights of each array can include LED lights or any appropriate light. The front light array 303 and the back light array 306 can each include a number of lights that correspond to the number of metal detectors in the metal detection array 312. The example here shows six rows, which are numbered in the individually-adjustable metal detection zones 315 for description purposes.

Metal detection thresholds can be configured and evaluated independently for each zone. If metal is detected past a threshold level for a particular zone, then an alert can be triggered. Alerts can include lighting up a particular set of lights from the front light array 303 and the back light array 306 and the double-sided top light 309. Alerts can also include transmitting an alert notification to the server device 130, and a client device 118 associated with an administrator and/or security personnel. The alert notification can indicate an identifier or name for the particular metal detection access control gate 101 that was triggered, as well as the zones that triggered the alert. The alert notification can also include an audible sound generated by the metal detection access control gate 101.

The double-sided top light 309 can be configured to illuminate a particular color (e.g., red) and flash or strobe in response to an alert. If there is no alert, the double-sided top light 309 can be illuminated with another color (e.g., green). The front light array 303 and the back light array 306 can be configured to illuminate to show which zone(s) triggered the alert. For example, a zone 6 alert can illuminate the front and back lights for row 2 of the right-hand side vertical component of the metal detector component 109 as shown, where row two can be the second row from the top row in this example. A zone 13 alert can illuminate the front and back lights for row 5 of the left-hand side vertical component of the metal detector component 109, where row 5 can be the second row from the bottom row in this example. A zone 11 alert can illuminate the front and back lights for row 4 of both the left-hand side vertical component and the right hand side vertical component of the metal detector component 109. The zone 11 alert can indicate both left and right to visually indicate that the center zone of row 4 is the location of the metal object.

Figure 4:
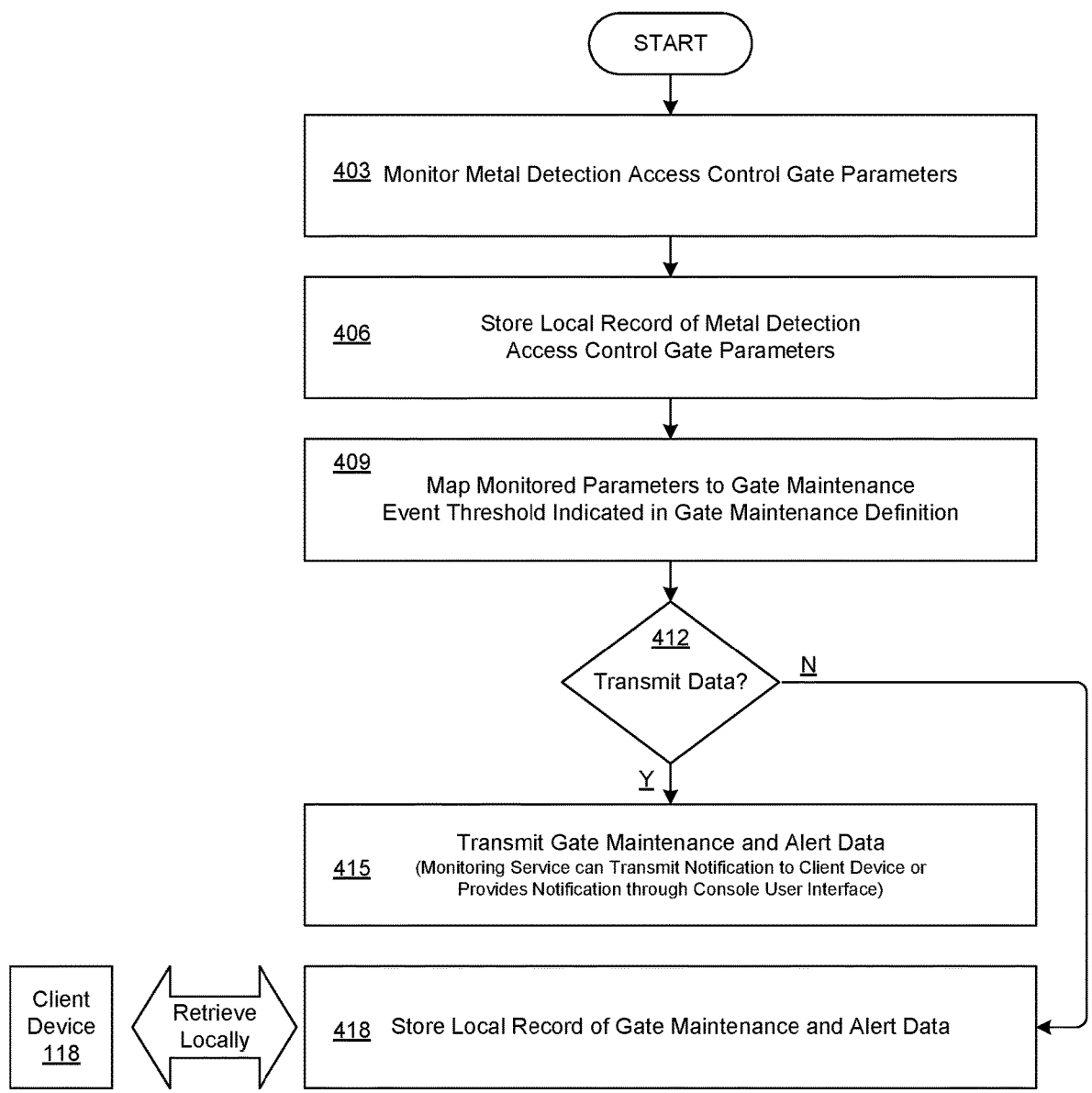
FIG. 4 is a flowchart that describes functionalities performed by the metal detection access control security gate system of FIG. 1, according to the present disclosure.

FIG. 4 shows a flowchart that describes functionalities performed by the metal detection access control security gate system 100. Generally, the flowchart describes how the monitoring component 112 can evaluate the monitored barrier component 106 usage parameters according to lifecycle rules to identify progress towards, and triggering of, a maintenance event, an alarm event, and other events. While the flowchart describes actions as performed by a particular component, the actions can be performed by and involve actions performed by other components.

In step 403, the monitoring component 112 can monitor parameters of the metal detection access control gate 101. The monitoring component 112 can monitor the barrier component 106 usage parameters specified or used for gate lifecycle rules to identify progress towards, and triggering of, a maintenance event definition. The parameters can include a rated number of actuations, recommended maximum number of actuations in a predetermined time period, open-close cycles, voltage, current, power, instantaneous peak power, average power over a period of time, and other operational parameters. The monitoring component 112 can monitor one or more of the operational parameters and trigger a notification if the actual value measured or monitored exceeds a threshold percentage, including percentages that are under, over, and equal to the rated value. The monitoring component 112 can monitor parameters of the barrier component 106, the metal detector component 109, and other components. Each of the operational parameters of the metal detection access control gate 101 and its constituent components can be monitored and evaluated to trigger maintenance events.

In step 406, the monitoring component 112 can store a local record of the parameters of the metal detection access control gate 101. The metal detection access control gate 101 can include a data storage device that can store selected records for local access by maintenance and administrative personnel. The local record can be accessible through a user interface of a display on the metal detection access control gate 101 or through a client device 118 that is connected using a wired or wireless connection.

In step 409, the monitoring component 112 can map monitored parameters to gate maintenance event thresholds indicated in the gate lifecycle rules or definitions. The event threshold can trigger an event such as a light, an audible sound, or other alarm. The event threshold can also trigger a gate action such as opening or closing a gate, a storage event, a notification transmission, or another action. For example, if the event is an error, it may be preferable to close the barrier component 106 until maintenance is performed. In other situations, it can be preferable to open the barrier component 106 until maintenance is performed. In other situations, it can be preferable to continue operation even if an error is being encountered. These actions can be configured as a preference.

In step 412, the monitoring component 112 can identify whether one or more events are to be transmitted to a monitoring service 132. In some examples, the monitoring component 112 of the metal detection access control gate 101 can transmit lifecycle, error, and other gate data to the monitoring service 132 periodically or on a schedule. In other examples, the monitoring component 112 can wait to receive a command from the monitoring service 132, and the command can instruct the monitoring component to transmit the lifecycle, error, and other gate data to a particular endpoint such as an Internet Protocol (IP) address, Uniform Resource Link (URL) or other network addresses of the monitoring service 132. In some examples, the command can include the network address and in other examples the monitoring component 112 can be preconfigured to transmit data to a particular network location. If a monitoring service is to receive alert data, monitoring data, maintenance data, or other gate data, then the process can proceed to step 415. Otherwise, the process can proceed to step 418.

In step 415, the monitoring component 112 can transmit gate maintenance and alert data to the monitoring service 132 or to a client device 118. This can include timestamped information about specific alerts, errors, activations, reconfigurations, and other data. The data can be accessed using a user interface of the client device 118 or the monitoring service 132. In some examples, the gate maintenance and alert data can be transmitted to the monitoring service 132, and the monitoring service 132 can transmit a notification to the client device 118, or provide a notification through a console user interface of the monitoring service 132. A client device 118 can log in, and a splash page or front page can indicate the notification of alerts, errors, activations, reconfigurations, and other data as discussed.

In step 418, the monitoring component 112 can store gate maintenance and alert data locally. This can include timestamped information about specific alerts, errors, activations, reconfigurations, and other data. The data can be accessed using a user interface on a display of the metal detection access control gate 101 or on a client device 118 that is connected over a wired or wireless network connection.

FIG. 5A is a drawing that shows functionalities provided by a user interface 500 of the metal detection access control security gate system 100. The console user interface 500 can include a navigation panel 503. The navigation panel 503 can include links or user interface elements that link to various pages of a console user interface 500 including a front page, an event monitoring page, a device allocation and management page or pages, a customer and account page or pages. The front page can include the user interface area or panel 506, a panel 509, a panel 512, and a notification or alert element 515. The front page can be customized for a customer view or a gate vendor view. In this examples, the front page can show a gate vendor view.

The panel 506 can include overview information relevant to the vendor or a specific customer. For example, the number of clients or customers can be relevant to a vendor but can be omitted for a specific customer. However, the total number of devices can be provided in either example. For a customer view, the total devices can indicate a number of gate devices that are registered with the monitoring service for a particular customer. For a vendor view, the total can include all gate devices that are registered across all customers or a selected subset of customers. Likewise, the runtime per device for a vendor or manufacturer view can show an average per-device or total runtime for all devices across all customers. However, a customer view can include a per-device average or a total runtime for the devices registered to the particular customer that is logged in and accessing the user interface 500.

The panel 509 can indicate the equipment that has been registered with the monitoring service 132 over time. In some examples, a graph view can be shown. The panel 509 can also include a user interface element that selects or toggles the graph or other user interface element to indicate new device registrations over time or total device registrations over time.

The panel 512 can indicate graphical elements that indicate events including faults or errors, repairs performed, and maintenance or repairs required and awaiting performance over a specified time period such as 'since the last login' or over a week or over a month, or another time period.

The notification or alert elements 515 can indicate a number of alerts or events, and can provide a selectable element that updates the user interface 500 to show more specific information about each alert or event. The additional information can include a specification or the alert definition or maintenance rule that triggered the event, the threshold value(s), and the actual monitored value(s).

FIG. 5B is a drawing that shows additional functionalities provided by the user interface 500 of the metal detection access control security gate system 100. The user interface 500 can be updated to show the navigation panel 503, and a registered devices panel 530. For a customer, the registered devices panel 530 can be limited to a particular customer. For a vendor, the registered devices panel 530 can include registered gate devices for all or a selected or filtered subset of customers.

The registered devices panel 530 can include an actions list that provides a specifies an action to perform for each metal detection access control gate 101. The actions list can include a list of action user interface elements that when selected, cause a particular action to be performed. For example, a "notify" action user interface element can cause a notification to be transmitted to a client device 118, phone number, email address, or other endpoint that is registered in association with the customer and/or the particular metal detection access control gate 101. The notification can include a message that provides event data and a textual description of the event that triggered the event.

A "manage" action user interface element can update the user interface 500 to show additional information for the metal detection access control gate 101 including a user interface to configure, enter, or edit the client device 118, phone number, email address, or other endpoint that is registered in association with the customer and/or the particular metal detection access control gate 101. The "manage" action user interface element can also enable a user to view all gate data received for the particular metal detection access control gate 101. This can include a record of events as well as a live view of monitored information including, voltage, power, current, alerts, triggered zones, and other data indicated to be monitored by the metal detection access control gate 101. A user interface element can also be selected to pull uncollected data from the metal detection access control gate 101.

A "schedule service" action user interface element can cause a notification to be transmitted to a client device 118, phone number, email address, or other endpoint that is registered as a maintenance provider or maintenance service for the customer and/or the particular metal detection access control gate 101. The notification can include a message that provides event data and a textual description of the event that triggered the event, and a textual description of repairs or maintenance to be performed in response to the event.

A map view user interface element 533 can switch the view of the user interface 500 to show the registered devices on a map that indicates a geolocation associated with each metal detection access control gate 101 in the registered devices panel 530. The location can be indicated as a GPS location, a city registered in association with the customer, a location entered or selected in a registration process, or another location.

The gate system can include at least one control circuit that performs actions, transmits notifications and other data, and performs the functionalities described. Although the functionalities, services, programs, and computer instructions described herein can be embodied in software or code executed by general purpose hardware as discussed above, as an alternative the same can also be embodied in dedicated hardware or a combination of software/general purpose hardware and dedicated hardware. If embodied in dedicated hardware, each can be implemented as a circuit or state machine that employs any one of or a combination of a number of technologies. These technologies can include, but are not limited to, discrete logic circuits having logic gates for implementing various logic functions upon an application of one or more data signals, application specific integrated circuits (ASICs) having appropriate logic gates, field-programmable gate arrays (FPGAs), or other components, etc. Such technologies are generally well known by those skilled in the art and, consequently, are not described in detail herein.

Also, the functionalities described herein that include software or code instructions can be embodied in any non-transitory computer-readable medium, which can include any one of many physical media such as, for example, magnetic, optical, or semiconductor media. More specific examples of a suitable computer-readable medium would include, but are not limited to, magnetic tapes, magnetic floppy diskettes, magnetic hard drives, memory cards, solid-state drives, USB flash drives, or optical discs. Also, the computer-readable medium can be a random access memory (RAM) including, for example, static random access memory (SRAM) and dynamic random access memory (DRAM), or magnetic random access memory (MRAM). In addition, the computer-readable medium can be a read-only memory (ROM), a programmable read-only memory (PROM), an erasable programmable read-only memory (EPROM), an electrically erasable programmable read-only memory (EEPROM), or other type of memory device.

Further, any logic or functionality described herein can be implemented and structured in a variety of ways. For example, one or more applications described can be implemented as modules or components of a single application or set of instructions. Further, one or more instructions described herein can be executed in shared or separate computing devices or a combination thereof.

The above-described examples of the present disclosure are merely possible examples of implementations set forth for a clear understanding of the principles of the disclosure. While aspects and figures are provided for clarity of discussion, it is understood that the concepts described with respect to a particular figure or context can be utilized and combined with the concepts described with respect to the other figures and contexts. These variations and modifications can be made without departing substantially from the principles of the disclosure. All such modifications and variations are intended to be included herein within the scope of this disclosure and protected by the following claims.

I claim:

1. A unitary metal detection barrier system, comprising:
   a barrier component that includes a positionable gate, the positionable gate being configured to be positioned in an open position and a closed position;
   a metal detector component;
   a base bracket structure that physically connects to the barrier component and connects to the metal detector component, wherein the unitary metal detection barrier system distances the barrier component from the metal detector component a distance that prevents electromagnetic interference between the barrier component and the metal detector component;
   at least one metal detector support bracket that connects to an edge of the metal detector component and the base bracket structure, wherein the metal detector support bracket is wider than a first width of the metal detector component perpendicular to a pedestrian walkway of the unitary metal detection barrier system, the base bracket structure being wider than a second width of the metal detector structure bracket perpendicular to the pedestrian walkway of the unitary metal detection barrier system; and
   a monitoring component that monitors at least one gate system parameter of the unitary metal detection barrier system.

2. The unitary metal detection barrier system of claim 1, wherein the metal detector component comprises a plurality of parallel sets of metal detection elements parallel about a vertical axis along which a respective one of the parallel sets of metal detection elements are aligned.

3. The unitary metal detection barrier system of claim 1, further comprising:
   a server device that executes a monitoring service.

4. The unitary metal detection barrier system of claim 1, wherein the at least one gate system parameter comprises at least one of: a count of activations of the barrier component, a count of errors, and a count of alarms.

5. The unitary metal detection barrier system of claim 1, wherein the at least one gate system parameter comprises at least one of: a current of the barrier component, a voltage of the barrier component, and a power of the barrier component.

6. The unitary metal detection barrier system of claim 1, wherein the monitoring component identifies a maintenance event based at least in part on the at least one gate system parameter, and the monitoring component stores or transmits maintenance data in response to identification of the maintenance event.

7. A gate system, comprising:
   a barrier component;
   a metal detector component;
   a base bracket structure that physically connects to the barrier component and connects to the metal detector component, wherein the base bracket structure distances the barrier component from the metal detector component a distance that prevents electromagnetic interference between the barrier component and the metal detector component;
   at least one metal detector support bracket that connects to an edge of the metal detector component and the base bracket structure, wherein the metal detector support bracket has a first width that is smaller than a second width of the base bracket structure perpendicular to a pedestrian walkway of a metal detection barrier system;
   a monitoring component that monitors at least one gate system parameter of the gate system and transmits the at least one gate system parameter to a monitoring service over a network.

8. The gate system of claim 7, wherein the monitoring service generates a user interface that shows the at least one gate system parameter.

9. The gate system of claim 8, wherein the monitoring component transmits the at least one gate system parameter in response to receiving a command from the monitoring service.

10. The gate system of claim 7, wherein the at least one gate system parameter comprises at least one of: a count of activations of the barrier component, a count of errors, and a count of alarms.

11. The gate system of claim 7, wherein the at least one gate system parameter comprises at least one of: a current of the barrier component, a voltage of the barrier component, and a power of the barrier component.

* * * * *